(12) United States Patent
Kakizaki et al.

(10) Patent No.: US 6,480,519 B2
(45) Date of Patent: Nov. 12, 2002

(54) GAS LASER DEVICE THAT EMITS ULTRAVIOLET RAYS

(75) Inventors: Koji Kakizaki, Mishima (JP); Motohiro Arai, Kawasaki (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 167 days.

(21) Appl. No.: 09/732,017

(22) Filed: Dec. 8, 2000

(65) Prior Publication Data

US 2001/0024463 A1 Sep. 27, 2001

(30) Foreign Application Priority Data

Dec. 8, 1999 (JP) ............................................. 11-348637

(51) Int. Cl.⁷ ............................................. H01S 3/097
(52) U.S. Cl. .............................. 372/87; 372/55; 372/86
(58) Field of Search ............................ 372/55, 54, 87, 372/86, 82

(56) References Cited

U.S. PATENT DOCUMENTS

| | | | | |
|---|---|---|---|---|
| 4,342,114 A | * | 7/1982 | Luck ............................ | 372/87 |
| 4,709,373 A | * | 11/1987 | Scott et al. ..................... | 372/86 |
| 5,293,390 A | * | 3/1994 | Furuya et al. .................. | 372/86 |
| 5,337,330 A | | 8/1994 | Larson | |
| 5,596,593 A | * | 1/1997 | Crothall et al. ................ | 372/87 |
| 6,381,257 B1 | * | 4/2002 | Ershov et al. ................. | 372/57 |

FOREIGN PATENT DOCUMENTS

| | | |
|---|---|---|
| JP | 3145170 | 6/1991 |
| JP | 5327070 | 12/1993 |
| JP | 8502145 | 3/1996 |
| JP | 2794792 | 9/1998 |
| JP | 10242553 | 9/1998 |

OTHER PUBLICATIONS

Mitsuo Mazada ed., "Excimer laser" pp. 64–65, Gakkai Shuppan Center Inc. first edition Aug. 20, 1983.

S. Ito, "Continuous operatio up to 3kHz in a discharge–pumped XeCl excimer laser," Applied Physics B63, pp. 107, Spring 1996.

* cited by examiner

Primary Examiner—Albert W. Paladini
(74) Attorney, Agent, or Firm—Nixon Peabody LLP; David S. Safran

(57) ABSTRACT

To reduce the cross-sectional area of a discharge circuit loop in the excitation circuit of a gas laser device that discharges ultraviolet rays, thereby reducing the inductance and enhancing the laser oscillation efficiency, the gas laser device is provided with a laser chamber (1) in which laser gas is sealed and which has a circulation means that circulates the laser gas within the chamber, a pair of main discharge electrodes (3, 4) disposed at a prescribed separation within said laser chamber (1), a discharge circuit having peaking capacitors ($C_3$) that are connected in parallel with the pair of main discharge electrodes (3, 4,) and a preionization unit (15) in which a first electrode (9) and a second electrode (7) are disposed facing each other with a dielectric (8) interposed between them, the preionization unit (15) being disposed running along each side of one of the main discharge electrodes (4), that one of the main discharge electrodes (4) and the peaking capacitors ($C_3$) being connected via a conduction member (25) that passes between the one of the main discharge electrodes (4) and the preionization unit (15).

3 Claims, 3 Drawing Sheets

GAS LASER DEVICE THAT EMITS ULTRAVIOLET RAYS

BACKGROUND OF THE INVENTION

1. Field of the Invention

The present invention concerns a gas laser device that emits ultraviolet rays, especially a gas laser device that emits ultraviolet rays, such as an excimer laser device having high oscillation efficiency.

2. Description of Related Art

Higher resolution is demanded of projection exposure equipment as the miniaturization and integration of semiconductor integrated circuits rise. Consequently, the wavelength of exposure light emitted from exposure light sources is becoming shorter, and gas laser devices that emit ultraviolet rays, such as ArF excimer laser devices or fluorine laser devices, would be viable candidates for the next generation of semiconductor exposure light sources.

Mixed gas comprising fluorine ($F_2$) gas, argon (Ar) and noble gases, such as neon (Ne), as a buffer gas in an ArF excimer laser device, or mixed gas comprising fluorine ($F_2$) gas and noble gases, such as helium (He) as a buffer gas, in a fluorine laser device would be sealed within a laser chamber at a pressure of several 100 kPa, and a pair of main discharge electrodes would be mounted facing each other with a prescribed separation. Laser gas, the laser medium, would be excited within the laser chamber by generating discharge at the main discharge electrodes.

Uniform discharge must be generated between the main discharge electrodes to efficiently generate laser light; but, the laser gas that is present in the discharge space between the main discharge electrodes is commonly subjected to preionization before the main discharge commences in order to generate a uniform discharge in a high-pressure gas atmosphere of several 100 kPa.

One means of generating the preionization would be the preionization method in which two electrodes are disposed facing each other with a dielectric interposed between them. Examples of such preionization units are presented in Japanese Kokai Publication Hei-5-327070, U.S. Pat. No. 2,794,792, Japanese Kokai Publication Hei-10-242553, Japanese patent publication No. 8-502145 and U.S. Pat. No. 5,337,330. All of the preionization units noted are structured with a first electrode (hereinafter abbreviated outer electrode) in contact with the outer surface of a tube formed from a dielectric and a second electrode (hereinafter abbreviated inner electrode) that is inserted within the tube. Corona discharge is created between the outer electrode and the dielectric tube by generating a potential difference between the outer electrode and the inner electrode, and laser gas that is present in the discharge space between the main discharge electrodes is subjected to preionization by ultraviolet light that is generated at this time. There are also cases, in addition to the preionization units in which the dielectric tube and the outer electrode are in proximity without making contact, as well as cases in which the outer electrode is covered by a dielectric substance.

FIG. 5 is a block diagram of an excitation circuit of a gas laser device that emits ultraviolet rays (hereinafter abbreviated gas laser device) using the preionization method. This excitation circuit has a circuit structure termed a charge transfer circuit that uses a solid state switch SW such as a JGBT. In a simple explanation of the operation following this circuit diagram, charge from a high voltage power source HV is held in capacitor $C_1$ when switch SW is opened. When switch SW is closed while the charge is held in capacitor $C_1$, the charge of capacitor $C_1$ transfers to capacitor $C_2$. The charge that had transferred to capacitor $C_2$ is then transferred to peaking capacitor $C_3$ via non-linear inductance $L_m$ termed a saturable inductance or a magnetic switch. The pulse amplitude of the voltage that is applied through the action of magnetic switch $L_m$ is compressed. The operation of magnetic switch $L_m$ is that the inductance increases while the charge of capacitor $C_1$ is transferred to capacitor $C_2$, and the inductance rapidly decreases upon saturation when the magnetic flux density has increased, thereby efficiently transferring the charge of capacitor $C_2$ to peaking capacitor $C_3$. Pulse discharge develops between the facing main discharge electrodes 3, 4 within laser chamber 1 when the voltage of peaking capacitor $C_3$ has risen and has reached the discharge breakdown voltage. Laser gas is then excited. Specifically, current flows through the discharge circuit loop shown by the thick lines in FIG. 5 as a result of this discharge.

A differential voltage circuit comprising capacitors C11, C12 and the inductances L0 are connected in parallel to charge electrodes 3, 4. The pulse voltage applied between the main discharge electrodes 3, 4 is divided, as shown in FIG. 6, and is lowered to a range of 25% to 75% thereof, after which voltage is applied in order to attain corona discharge between the outer electrodes 9 and inner electrodes 7 within corona preionization units 15 that are disposed near the upstream side and downstream side of the main discharge space between main discharge electrodes 3, 4. The optimum values of the differential voltage ratio, the capacitance of capacitors $C_{11}$, $C_{12}$, and inductance $L_0$ are selected, the time constant is set to the desired value, and the timing of corona preliminary discharge versus the main discharge is adjusted. The composite capacitance of this differential voltage circuit is adjusted to a level under 10% of peaking capacitor $C_3$.

Incidentally, the laser oscillation efficiency is known to be enhanced as the inductance created by the discharge circuit loop falls (Mitsuo Maeda ed. "Excimer laser" pp. 64–65, Gakkai Shuppan Center Inc. first edition Aug. 20, 1983)

FIG. 6 shows a block diagram of an actual discharge circuit loop mentioned above. FIG. 6 is a cross-sectional view of the principal parts of a gas laser device perpendicular to the direction of laser oscillation. Those constituent elements given the same notation in FIG. 6 as in FIG. 5 correspond to the constituent elements shown in FIG. 5.

In a simple explanation, insulation base 21 is inserted in an airtight manner on the upper wall of laser chamber 1 so as to lie along the longitudinal direction of the discharge space. The other main discharge electrode 3 (for example, a cathode) is attached to the insulation base 21 centrally inside of laser chamber 1 and is connected to high voltage power source 10 via current induction unit 23 penetrating the insulation base 21. Here, high voltage power source 10 corresponds to the circuit section containing non-linear inductance $L_m$ on the left side of the peaking capacitor $C_3$ in FIG. 5. A pair of conduction units 25 are attached roughly parallel to insulation base 21 so as to lie on both sides of main discharge electrode 3 within laser chamber 1. Electro-conductive base 26 is extended across the ends of conduction unit 25 and one of the main discharge electrodes 4 (for example, the anode) is attached at the center opposite main discharge electrode 3 at the top in the center. Peaking capacitors $C_3$, comprising a plurality of capacitors connected in parallel, are connected to both sides of current induction unit 23 outside of laser chamber 1. Peaking capacitors $C_3$ are connected to conduction unit 25 via the current induction unit 24 that pierces insulation base 21. Furthermore, preionization unit 15, in which outer electrode 9 and inner electrode 7 are disposed facing each other with interposed dielectric tube 8, is disposed at the view position of the main discharge space, between the main discharge electrodes 3, 4, upstream and downstream of the laser gas stream 2 (denoted by arrows above electroconductive base 26). Outer electrode 9 is connected directly to electroconductive base 26 while inner electrode 7 is connected between capacitor $C_{11}$ and $C_{12}$ of high voltage power source 10 via a terminal that is not illustrated.

The section enclosed by broken lines in the structure shown in FIG. 6 is the discharge circuit loop explained in FIG. 5. It comprises the current induction unit 23 that pierces insulation base 21, main discharge electrode 3 connected to current induction unit 23, main discharge electrode 4, electroconductive base 26 in which main discharge electrode 4 is installed, conduction unit 25 connected to electroconductive base 26, current induction unit 24 that is connected to conduction unit 25 and which pierces insulation base 21, and peaking capacitor $C_3$ to which current induction unit 24 and current induction unit 23 are connected.

As mentioned above, the laser oscillation efficiency is enhanced as the inductance created by the discharge circuit loop falls. Since the inductance is proportional to the cross-sectional area of the discharge circuit loop (area of the cross section in FIG. 6), it must be structured so as to minimize the cross-sectional area. Specifically, this must be structured so that the cross-sectional area of the space enclosed by the broken line in FIG. 6 that includes current induction unit 23, main discharge electrode 3, main discharge electrode 4, electroconductive base 26, conduction unit 25, current induction unit 24, peaking capacitor $C_3$ is small.

However, the potential difference of current induction unit 23, main discharge electrode 3, peaking capacitor $C_3$ from laser chamber 1 that is usually grounded is great, at 20 to 30 kV, which brings about dielectric breakdown if the separation is too close. Accordingly, the size of insulation base 21 cannot be too small.

Furthermore, the separation of the main discharge electrode 3 and the main discharge electrode 4 determines the magnitude of the laser light that is emitted, but the size of the laser light is restricted to a certain extent as a function of the application. For example, the separation would be 15 to 18 mm for an ArF excimer laser used in semiconductor exposure, and it cannot be made too short.

In addition, the size of the electroconductive base 26 cannot be too small since preionization units 15 are disposed on both sides of the main discharge electrode 4.

Furthermore, the cross-sectional area of the discharge circuit loop can be reduced as the position of the conduction unit 25 that links the electroconductive base 26 with the current induction unit 24 approaches preionization unit 15. However, conduction unit 25 begins to act like outer electrode 9 as the conduction unit 25 approaches the preionization unit 15 since conduction unit 25 has the same potential as that of the outer electrode 9 that forms preionization unit 15. When that happens, corona discharge takes place on even the side opposite from that of the discharge space between main discharge electrodes 3, 4. The ultraviolet rays that are created due to this corona discharge no longer reach the discharge space, and thus, does not contribute to preionization of laser gas present in the discharge space. Specifically, the energy supplied for corona discharge that occurs between dielectric tube 8 and outer electrode 9 decreases due to the excess corona discharge, and that leads to the potential for inadequate preionization.

Furthermore, in the case of the UV arc preionization method since discharge breakdown develops between the high voltage side of the preionization electrode and a conduction member when the conduction member is positioned outside of a pair of electrodes for preionization (opposite side from the electrode) and is brought too close to the electrodes for preionization, they should not be brought too close together as stated in Japanese Kokai Publication Hei-3-145170 and Applied Physics B, Vol. 63, pp. 1–7. Consequently, the cross-sectional area of the discharge circuit loop cannot be made too small.

The inventors have determined that the inductance created by the discharge circuit loop shown in FIG. 6 would be a minimum of 10 nH in the case of a conventional excimer laser device.

SUMMARY OF THE INVENTION

The present invention was devised to resolve the problems associated with conventional technology. The purposes are to reduce the cross-sectional area of a discharge circuit loop in an excitation circuit of a gas laser device that emits ultraviolet rays, to reduce the inductance and to enhance such characteristics as the laser oscillation efficiency.

A gas laser device that emits ultraviolet rays and attains the purposes is provided with a laser chamber in which laser gas is sealed and which has a circulation means that circulates this laser gas within the laser chamber, a pair of main discharge electrodes disposed at a prescribed separation within the laser chamber, a discharge circuit comprising peaking capacitors that are connected in parallel with this pair of main discharge electrodes, and a preionization means in which a first electrode and a second electrode are disposed facing each other with a dielectric interposed between them, wherein this preionization means is disposed near both sides of one of the main discharge electrodes so as to run alongside thereof, wherein one of the main discharge electrodes and the peaking capacitors are connected via a conduction member that passes between one of the main discharge electrodes and the preionization means.

In this case, the conduction member comprises a conductor plate with an aperture opened within it, the aperture transiting laser gas that passes through the main discharge space between the main discharge electrodes and being disposed so that ultraviolet rays from the preionization means reach the main discharge space.

Furthermore, the preionization means is structured from a second electrode covered by a dielectric substance and a first electrode that makes contact with the outer surface of the dielectric substance about the periphery of the second electrode, and the conduction member and the first electrode should be integrated.

The characteristics of the gas laser device that emits ultraviolet rays, such as the laser oscillation efficiency, can be enhanced since the cross-sectional area of the discharge circuit loop in the excitation circuit can be reduced and the inductance of the discharge circuit loop can be reduced because one of the main discharge electrodes and the peaking capacitor are connected by a conduction member that passes between one of the main discharge electrodes and the preionization means in the present invention.

DETAILED DESCRIPTION OF THE INVENTION

In the following, counterparts to the conventional gas laser device described above have been given the same reference numbers in the figures showing the present invention to facilitate comparison.

Figure 1:
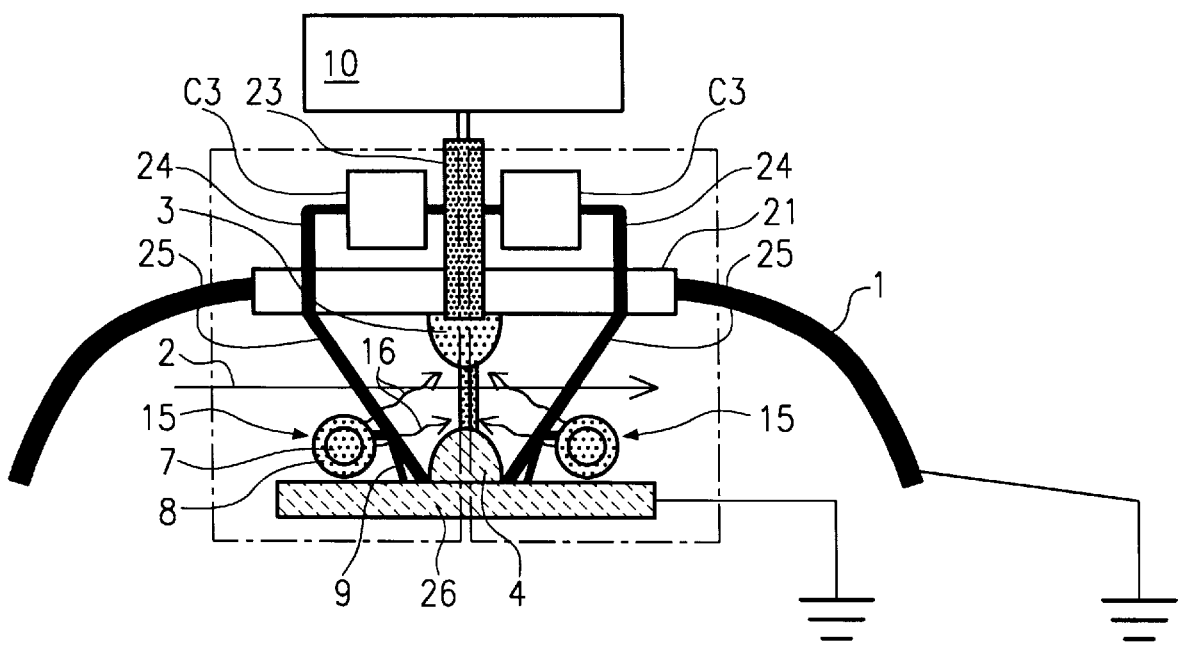
FIG. 1 is a cross-sectional view perpendicular to the laser oscillation direction of the principal parts of the gas laser device in accordance with a first embodiment of the present invention.
Figure 2:
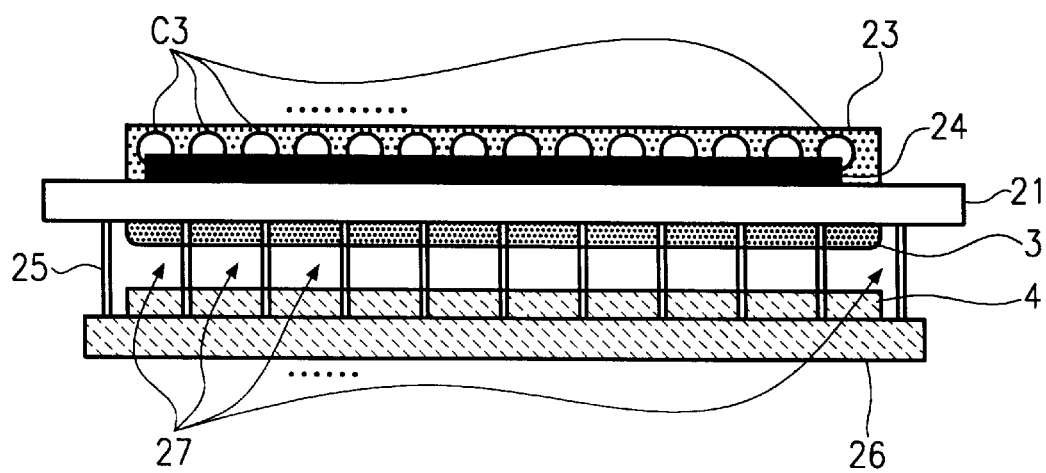
FIG. 2 is a side view of the principal parts of the gas laser device shown in FIG. 1.
Figure 5:
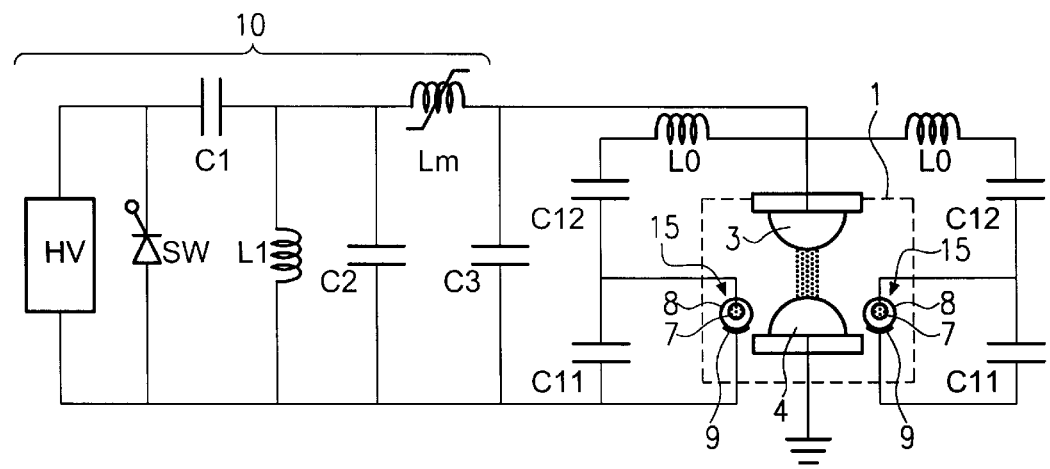
FIG. 5 is a diagram showing an example of a known excitation circuit of a gas laser device.

In the embodiment shown in FIGS. 1 & 2, an excitation circuit is used that has the same structure as that in conventional devices, for example, the structure shown in FIG. 5. A fan circulates the laser gas sealed within laser chamber 1 and a heat exchanger cools the laser gas but are not illustrated in FIGS. 1 and 2. Furthermore, the preionization unit 15 shown in FIG. 1 is not illustrated in FIG. 2.

An insulation base 21 of this gas laser device is inserted in the upper wall of laser chamber 1 in an airtight manner so as to lie along the longitudinal direction of the discharge space. A main discharge electrode 3 (for example, a cathode) is attached to the insulation base 21 centrally in the laser chamber 1. The main discharge electrode 3 is connected to a high voltage power source 10 via a current induction unit 23 penetrating the insulation base 21. Here, the high voltage power source 10 corresponds to the circuit section containing the non-linear inductance $L_m$ on the left side of the peaking capacitor $C_3$ in FIG.

A pair of conduction units 25 are attached to insulation base 21 so as to lie on both sides of main discharge electrode 3 within laser chamber 1 with their ends angled toward each other. An electroconductive base 26 is extended across the ends of the conduction units 25 so as to extend beyond both sides. Another of main discharge electrodes 4 (for example, the anode) is attached over the electroconductive base 26 at a position opposite the main discharge electrode 3 at the top of a pair of conduction units 25.

A preionization unit 15, comprising an outer electrode 9 and an inner electrode 7 that are disposed facing each other with a dielectric tube 8 interposed between them, is disposed at the anticipated position of the main discharge space between the main discharge electrodes 3, 4 that passes through conduction units 25 in regions above the outside of both locations where the ends of the pair of conduction units 25 of the electroconductive base 26 are connected. Outer electrode 9 is directly connected to electroconductive base 26, and inner electrode 7 is connected between capacitors $C_{11}$ and $C_{12}$ of high voltage power source 10 via a terminal that is not illustrated.

Furthermore, peaking capacitors $C_3$, comprised of a plurality of capacitors that are connected in parallel to both sides of current induction unit 23, are connected on the outside of laser chamber 1. Peaking capacitors $C_3$ are connected to the conduction units 25 via current induction unit 24 that pierces the insulation base 21.

Conduction unit 25 comprises conductor plates extending longitudinally at prescribed intervals to form aperture units 27, shown in the side view of FIG. 2. A laser gas stream 2 flows without obstruction through the aperture units 27 in the main discharge space between the main discharge electrodes 3, 4, and ultraviolet rays 16 created by corona discharge at preionization unit 15 transit aperture units 27 so as to reach the main discharge space between main discharge electrodes 3, 4.

In the structure shown in FIG. 1, the section enclosed by broken lines is the discharge circuit loop explained with reference to FIG. 5, above. The discharge circuit loop comprises the current induction unit 23 that pierces the insulation base 21, the main discharge electrode 3 that is connected to the current induction unit 23, the other main discharge electrode 4, the electroconductive base 26 in which main discharge electrode 4 is installed, the conduction units 25 connected to the electroconductive base 26, the current induction unit 24 that is connected to conduction unit 25 and which pierces the insulation base 21, and the peaking capacitors $C_3$ to which the current induction unit 24 and current induction unit 23 are connected.

Figure 6:
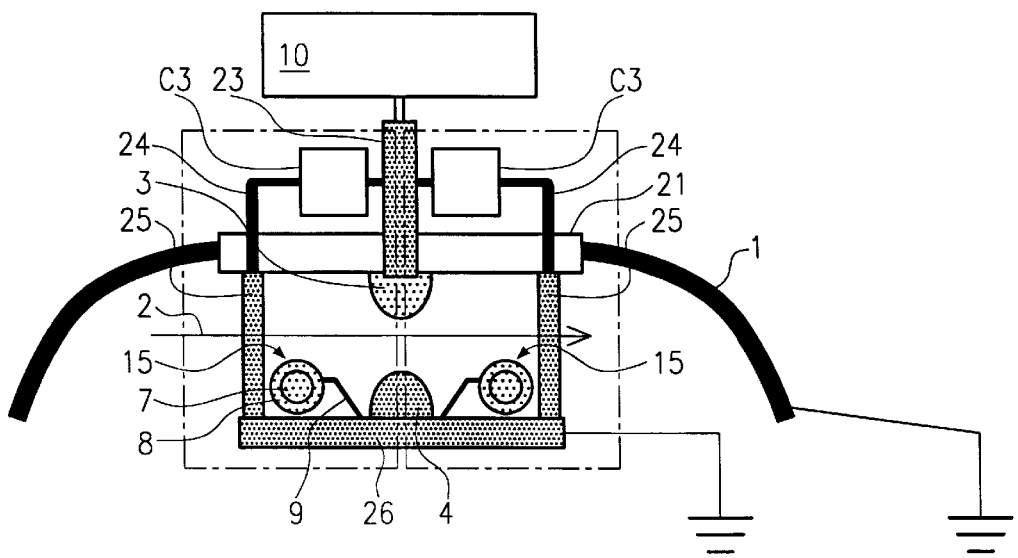
FIG. 6 is a cross-sectional view perpendicular to the laser oscillation direction of the principal parts of a conventional gas laser device.

The difference between this embodiment and the conventional technology shown in FIG. 6 is the disposition of the conduction unit 25 of which each end is connected to the electroconductive base 26 and the current induction unit 24 that pierces insulation base 21. In the conventional technology shown in FIG. 6, the contact point of conduction unit 25 and electroconductive base 26 is disposed on the outside of the preionization unit 15 (on the side opposite from main discharge electrode 4) while in this embodiment, the contact point is disposed so as to lie between main discharge electrode 4 and preionization unit 15. By so doing, the route from main discharge electrode 4 in the discharge circuit loop to the current induction unit 24 via the electroconductive base 26 and conduction unit 25 can be shortened even though the size of the electroconductive base cannot be reduced too much because preionization unit 15 is disposed on both sides of main discharge electrode 4, so that the conduction unit 25 will pass between one of main discharge electrodes 4 and the preionization unit 15. This enables the cross-section of the discharge circuit loop to be miniaturized somewhat.

Aperture areas 27 are open in conduction unit 25, as shown in FIG. 2, so that ultraviolet rays 16 for preionization, that were created in the preionization unit 15, will reach the main discharge space, as explained above.

Incidentally, the thermal distribution of laser gas present in the main discharge space becomes uneven after main discharge occurs between main discharge electrodes 3, 4 in a gas laser device, and the subsequent main discharge in that state would occur unevenly, with the result being that efficient laser oscillation cannot be realized. For that reason, laser gas within laser chamber 1 is circulated by a fan (not shown) to replace the laser gas present in the main discharge space before the next occurrence of main discharge. The aperture units 27 of the conduction unit 25 also have the function of not obstructing the circulating laser gas stream 2 that flows through this main discharge space from reaching the main discharge space. The aperture rate in one piece of metal plate of aperture units 27 exceeds 90%.

Conduction unit 25 may be structured from a plurality of thin flat plates that are disposed at prescribed intervals so as to secure aperture units 27 through which laser gas stream 2 and ultraviolet rays 16 transit, or it may be structured by opening aperture units 27 in one metal plate, but the latter is more advantageous for the following reasons.

Conduction unit 25 is disposed between main discharge electrode 4 and preionization unit 15 in the structure presented in FIGS. 1 & 2. The thickness of the plurality of thin flat plates must be a thickness selected to insure adequate strength to secure aperture units 27 when a plurality of thin flat plates are disposed at prescribed intervals. Since increasing the thickness in the direction perpendicular to the direction of laser gas stream 2 would obstruct the laser gas stream 2, the plates should be thickened in a direction parallel to the direction of laser gas stream 2. By so doing, preionization unit 15 will be spaced from the main discharge space to the extent that the thickness is increased and the intensity of ultraviolet rays 16 reaching the main discharge space would decrease by the amount to which the discharge unit becomes thicker. That would have the effect of weakening preionization which would reduce the laser characteristics.

In the latter case, adequate strength can be obtained even if the thickness in the direction parallel to the direction of laser gas stream 2 is thinner than in the former case since aperture unit 27 is opened in a metal plate in an integrated structure. Consequently, preionization unit 15 can approach the main discharge space more than in the former case. Preionization can be intensified as the intensity of ultraviolet rays 16 reaching the main discharge space is raised, and the laser characteristics can be enhanced.

Figure 3:
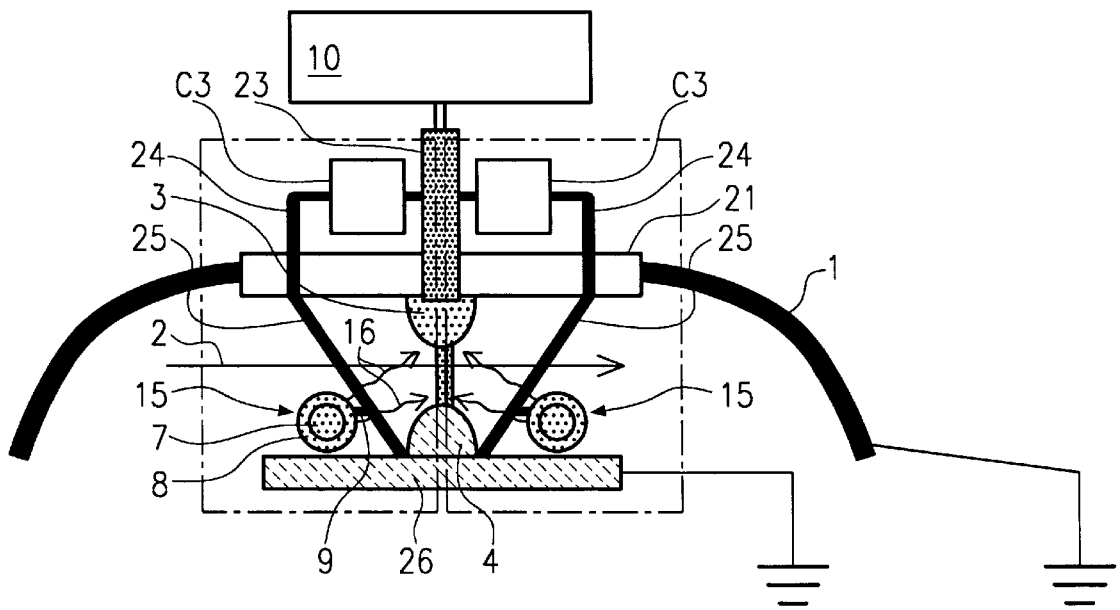
FIG. 3 is a cross-sectional view perpendicular to the laser oscillation direction of the principal parts of the gas laser device in accordance with a second embodiment of the present invention.
Figure 4:
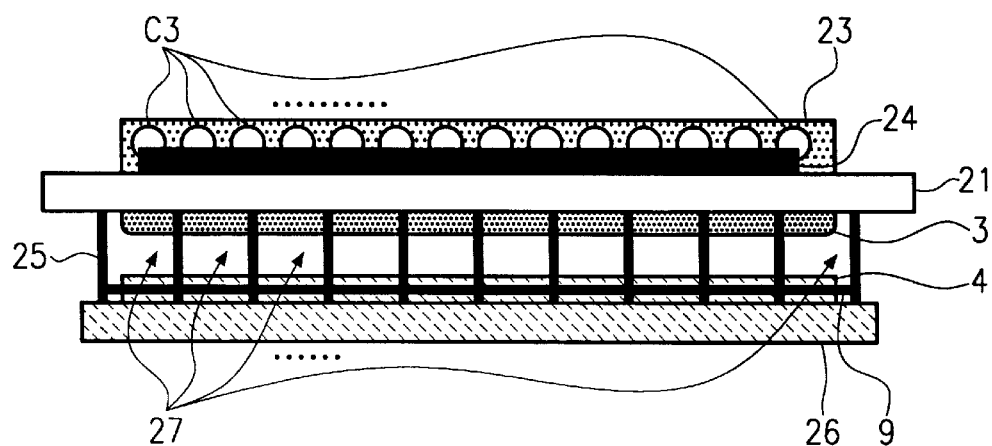
FIG. 4 is a side view of the principal parts of the gas laser device shown in FIG. 3.

FIGS. 3 & 4 show the principal parts of a gas laser device in accordance with a modified second embodiment of the present invention. The difference between this embodiment and the first embodiment is that the outer electrode 9 of the preionization unit 15 is integrated with conduction units 25 shown in FIGS. 1 & 2. The structure is otherwise identical with that of the first embodiment.

In this embodiment, a straight metal unit comprising outer electrode 9 is integrated by means, such as welding, at a position near dielectric tube 8 of preionization unit 15 to the side of conduction unit 25. This outer electrode 9 may also be attached so as to contact the outer surface of dielectric tube 8 about the periphery of inner electrode 7 of preionization unit 15.

Preionization unit 15 can approach the main discharge space closer than in the first embodiment since conduction unit 25 and outer electrode 9 are integrated in this embodiment. The intensity of ultraviolet rays 16 reaching the main discharge space is raised which intensifies the preionization, thereby permitting the laser characteristics to be enhanced.

The inductance of the discharge circuit can be set at 6 nH in the gas laser device manufactured by the inventors using the structure of the first embodiment or second embodiment in contrast to the 10 nH level of a conventional device.

A gas laser device that discharges ultraviolet rays pursuant to the present invention was explained above based on embodiments, but the present invention, which is not restricted to the embodiments, may be modified.

As explained above, in the discharge circuit loop the route from the main discharge electrode 4 to current induction unit 24 via the electroconductive base 26 and conduction unit 25 can be shortened and the cross-sectional area of the discharge circuit loop can be reduced in the gas laser device pursuant to the present invention that emits ultraviolet rays having the contact point of conduction unit 25 and electroconductive base 26 disposed so as to lie between main discharge electrode 4 and preionization unit 15.

Furthermore, ultraviolet rays 16 for preionization can reach the main discharge space without being obstructed by conduction unit 25 as a result of opening aperture units 27 in conduction unit 25, and circulating laser gas stream 2 that flows through the main discharge space is not obstructed from reaching the main discharge space.

In particular, the thickness in the direction parallel to the direction of laser gas stream 2 can be made thinner by forming the conduction unit 25 in an integrated structure by the opening aperture units 27 being in one metal plate. This has the benefits of intensifying ultraviolet rays 16 that reach the main discharge space, and of thereby intensifying the preionization to thereby enhance the laser characteristics.

Furthermore, preionization unit 15 can be brought closer to the main discharge space by integrating the conduction unit 25 with the outer electrode 9, which has the effects of intensifying ultraviolet rays 16 that reach the main discharge space, intensifying the preionization in turn, and thereby enhancing the laser characteristics.

What is claimed is:

1. A gas laser device that emits ultraviolet rays comprising:

a laser chamber in which a laser gas is sealed;

a circulation means within the laser chamber for circulating the laser gas in the laser chamber;

a pair of main discharge electrodes disposed at a prescribed separation within said laser chamber;

a discharge circuit comprising peaking capacitors that are connected in parallel with the pair of main discharge electrodes; and a preionization means in which a first electrode and a second electrode are disposed facing each a dielectric interposed therebetween;

wherein a respective said preionization means is disposed running along each side of one of the main discharge electrodes, wherein one of the main discharge electrodes and the peaking capacitors are connected via a conduction member that passes between said one of main discharge electrodes and said preionization means.

2. A gas laser device according to claim 1, wherein the conduction member comprises a conductor unit with aperture openings therein, said aperture openings transiting laser gas that passes through the main discharge space between the main discharge electrodes and is disposed so that ultraviolet rays from the preionization means reach the main discharge space.

3. The gas laser device according to claim 1, wherein the preionization means comprises said second electrode, a dielectric substance covering said second electrode and the first electrode in contact with an outer surface of the dielectric substance extending around the periphery of said second electrode; and wherein the conduction member and the first electrode are integrated with each other.

* * * * *